SOUND REPRODUCTION APPARATUS

Filed Jan. 13, 1967 Sheet 1 of 2

INVENTOR
HENRY HARTOG

BY Browne, Schuyler & Beveridge
ATTORNEY

SOUND REPRODUCTION APPARATUS

Filed Jan. 13, 1967

INVENTOR

HENRY HARTOG

BY Browne, Schuyler & Beveridge

ATTORNEY 3,424,465
Patented Jan. 28, 1969

1

3,424,465

SOUND REPRODUCTION APPARATUS

Henry Hartog, 38 Guizi, Psychico, Athens, Greece

Filed Jan. 13, 1967, Ser. No. 609,189
U.S. Cl. 274—1 9 Claims
Int. Cl. G11b 3/34

ABSTRACT OF THE DISCLOSURE

Sound reproduction apparatus in which a record disc is rotated at a constantly varying angular rate while being radially traversed by a record cutting or pick-up stylus. The angular rate of the disc and the radial rate of the stylus produces a constant linear rate between the disc and the stylus at the point of contact therebetween.

In conventional apparatus for reproducing sound from disc records, the recording is produced by rotating the recording disc at a constant angular rate (r.p.m.) while traversing the record in a straight radial line at a constant rate with a record cutting stylus. The recording so produced is then played by rotating the record at a constant r.p.m. past a pick-up head in contact, through a stylus, with the sound track on the upper surface of the record. The stylus is normally supported on the free end of a pivoted tone arm for movement in an arcuate, generally radial direction across the record as the stylus traverses the helical sound track on the record. As the radial distance between the stylus and the record center of rotation changes both while the record is being cut and during playback, while the angular rate of rotation of the record remains constant, it necessarily follows that the linear speed at which the stylus travels with respect to the record is constantly varying.

This linear speed, commonly called pick-up speed, is a very important consideration in the art of recording and sound reproducing. It effects the quality of the recording by determining the highest frequency of sound which can be resolved by the system. Within certain limits, high frequency resolution is proportional to pick-up speed, and sufficient speed must be maintained throughout the recording to provide sufficient resolution. On the other hand, pick-up speed higher than that prescribed by the minimum value of high frequency resolution is undesirable because it reduces the time available for playback per unit length of sound track. Also, this excessive pick-up speed increases the wear on both the stylus and the record.

Thus, considerations of sound track economy and the quality of the recording dictate a single value, or a narrow band of values, of pick-up speed for a particular recording. However, in conventional constant r.p.m. apparatus, the pick-up speed varies over a wide range as the stylus moves from the outer edge toward the center of the record. As a result, the quality of the recording varies over a wide range. If there is sufficient speed at the inner grooves to maintain proper sound resolution, the pick-up speed is unnecessarily high at the outer grooves. Conversely, if the optimum pick-up speed is utilized in the outer grooves, the pick-up speed is inadequate at the inner grooves. Thus, in practice, it is necessary to compromise, with the optimum sound track speed appearing near the center of the recording, and the acceptable variations from this optimum pick-up speed determines the maximum and minimum effective radii of constant r.p.m. disc records. Whatever the size, available sound track is poorly utilized.

A constant pick-up speed recording eliminates the above disadvantages of constant r.p.m. recordings, and the size of the constant pick-up speed record is limited

2 only by structural considerations, provided tracking error in the reproducing apparatus is eliminated. While numerous attempts have been made to provide a constant pick-up speed sound reproducing apparatus for disc records, these attempts have not been entirely satisfactory and, accordingly, have not met widespread acceptance. It is, therefore, a primary object of this invention to provide an improved sound reproduction apparatus for disc records.

Another object is to provide such an apparatus in which the disc record is driven at a constantly varying rate to provide a constant linear rate between the stylus and the record.

Another object is to provide such an apparatus in which the stylus is supported in a manner to eliminate tracking error.

Another object is to provide such an apparatus which may be employed either to record sound on a disc record, or to reproduce sound recorded on a disc record.

In the attainment of the foregoing and other objects, an important feature of the invention resides in a record turntable which is supported for rotation about a vertical axis, and a stylus is pivotally supported above the turntable so that, during playback, the needle is in contact with the sound track on the upper face of the record. A constant r.p.m. motor rotates a friction drive wheel in driving engagement with a disc surface forming a part of, or operatively connected to, the turntable for rotation therewith about a fixed axis. The friction drive wheel is positioned radially along the disc surface to vary the angular rate of rotation of the disc, and thereby of the turntable, in accordance with the radial position of the friction drive wheel. The drive wheel is positioned radially of the disc surface by a guide follower in engagement with the helical guide track which, in turn, is rotated at a rate proportional to the rate of the turntable. Thus, by continuously varying the radial position of the constant r.p.m. drive wheel along the driven disc surface, the angular rate of the disc surface, and the turntable is constantly changed. The arrangement is such that the radial position of the friction drive wheel with respect to the disc surface corresponds to the radial position of the pick-up on the disc record so that the linear pick-up speed of the stylus is constant.

Other objects and advantages of the invention will become apparent from the following specification, taken with the drawings, in which.

Figures 1, 10:
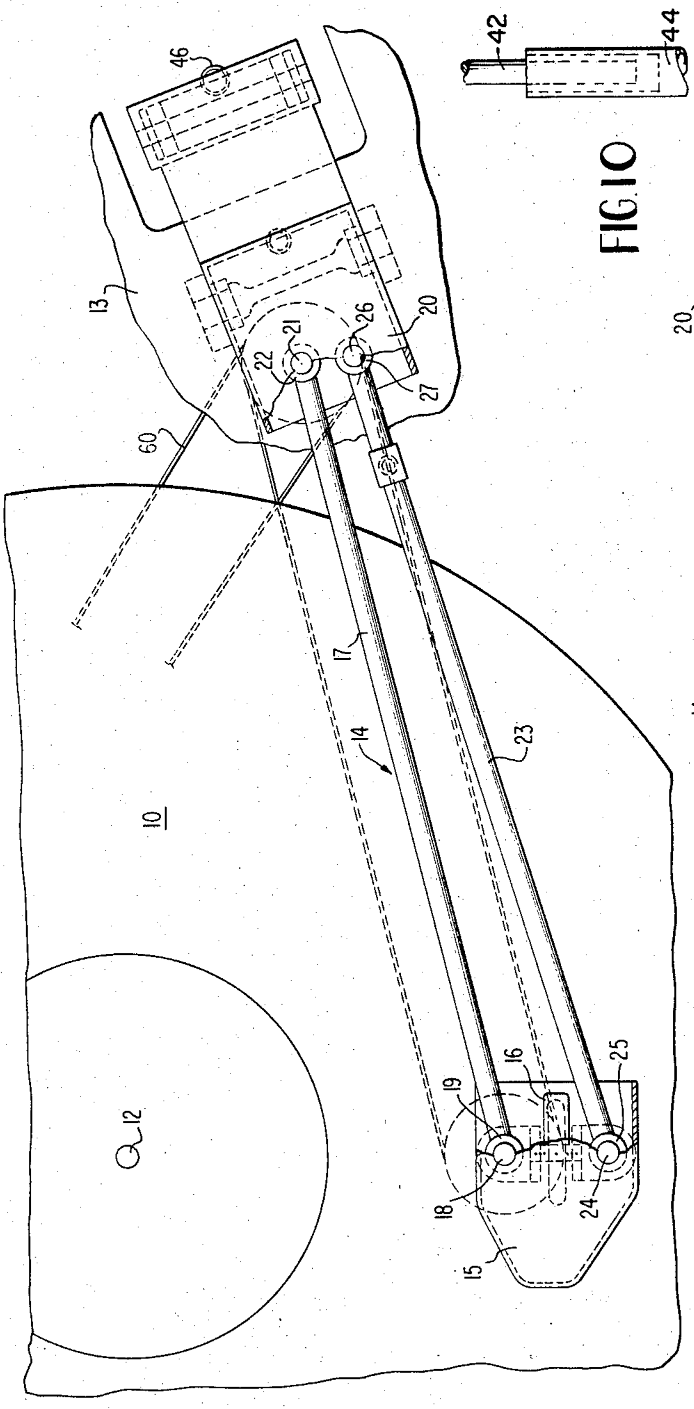
FIG. 1 is a fragmentary top plan view of a disc record sound reproducing apparatus according to the present invention.
FIGURE 10 is an enlarged fragmentary view taken on line 10—10 of FIGURE 2.
Figure 2:
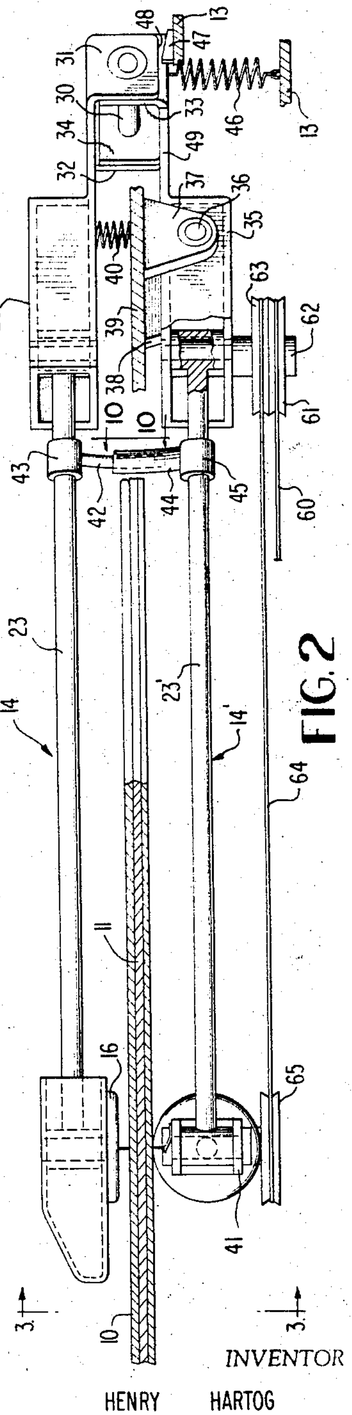
FIG. 2 is an elevation view of the apparatus shown in FIG. 1.

Referring now to the drawings in detail, a disc record 10 is supported on the upper surface of a turntable 11 for rotation about a vertical shaft 12 supported in a suitable mechanism frame 13 of which fragmentary portions only are illustrated in the drawings. A tone arm assembly 14 supports a pick-up head 15 above the upper surface of record 10 for generally arcuate movement thereover while maintaining the axis of the stylus 16 on pick-up head 15 substantially tangential to the helical groove in the recording. Tone arm assembly 14 comprises a support arm 17 having one end pivotally connected to pick-up head 15 by a vertical pin 18 extending through sleeve 19 rigidly fixed on the end of the support arm. The other end of arm 17 is pivotally supported on a bracket 20 by a vertical pin 21 extending through sleeve 22.

An elongated guide arm 23 has one end pivotally mounted to the pick-up head 15 by a vertical pin 24 extending through a sleeve 25 on the end of the arm 23 at a point spaced outwardly generally radially of the record 10 from the pin 18. The other end of the guide arm 23 is pivotally connected to the bracket 20 by a pin 26 extending through a sleeve 27 at a point spaced laterally from pin 21. The length of the respective arms 17 and 23, and the location of the pivot pins 19, 21, 24 and 26 are such that, upon movement of the tone arm in its generally arcuate path across the face of the recording disc 10, the stylus 16 is swung through an arc which extends through the center of rotation of the disc record 10. At the same time, the pick-up head is pivoted about the pins 18 and 24 to maintain the stylus substantially perpendicular to a radius of the record and tangential to the sound track in the record.

To permit the tone arm to be lifted vertically above the upper surface of the record, the bracket 20 is supported for pivotal movement about a horizontal axis by a shaft 30 extending through openings in downwardly turned tabs 31, 32 on the end of bracket 20. The shaft 30 extends through and is supported by upwardly extending tabs 33, 34 on a second bracket 35 which, in turn, is supported for pivotal movement about a horizontal axis by shaft 36 extending through journalled blocks 37, 38 projecting downwardly from the horizontal platform 39 of chassis 13. A resilient spring element 40 is positioned between the upper surface of platform 39 and bracket 20 to support a substantial portion of the weight of the tone arm assembly 14 and bracket 20 to thereby reduce the pressure exerted by the stylus 16 upon the record 10.

A second arm assembly 14' is mounted on bracket 35 and extends outwardly therefrom beneath the turntable 11 to support a drive bracket 41 directly beneath the pick-up head 15. This drive arm assembly 14' is identical in construction and size to the tone arm assembly 14, and therefore will not be described again in detail here. Corresponding parts of the drive arm assembly 14' have been given corresponding reference numerals in the drawings, with the parts of the drive arm assembly being indicated with a prime (') mark. The arm assemblies 14, 14' may be maintained substantially in vertical alignment by a pin 42 rigidly mounted on a sleeve 43 supported on arm 23, with the pin 42 projecting downwardly into the open end of a tube 44 rigidly mounted on a sleeve 45 supported on arm 23'. Pin 42 and tube 44 are slightly curved to permit vertical movement of the arm assemblies with respect to one another about the pivotal axis of shaft 30 while maintaining the arm assemblies in vertical alignment.

The bracket 35 is urged for rotation about the horizontal shaft 36 by a resilient spring 46 having one end attached to the bracket 35 and its other end attached to a rigid portion of the apparatus frame 13. A fixed cam 47 is mounted on the frame 13 in position to engage a cam surface 48 on the tab 31 of bracket 20 so that rotation of the bracket 20 about the shaft 30 by lifting the tone arm assembly 14 above the surface of the record 10 will simultaneously cam the shaft 31 and the rearwardly directed portion 49 of bracket 35 upwardly against the force of the spring 46 to thereby pivot the arm assembly 14' downwardly. Thus, movement of the stylus 16 out of engagement with the disc record 10 automatically moves the drive bracket 41 downwardly to a disengaged position.

To drive the turntable 11 and the disc record 10 for rotation about the vertical shaft 12, a constant r.p.m. motor, not shown, drives a belt 60 which extends around and drives a pulley 61 rotatably supported on a shaft 62 rigidly fixed on and projecting downwardly from bracket 35. A second pulley 63 is mounted on shaft 62 and fixed to pulley 61 for rotation therewith, and a belt 64 extending around pulley 63 drives a third pulley 65 for rotation about a vertical shaft 66 on the drive bracket 41. A friction drive wheel 67 is rotatably supported on a horizontal shaft 68 midway between the pins 18' and 24' which support the drive bracket 41 on the support arm assembly 14'. The vertical shaft 66 and the horizontal shaft 68 are disposed at right angles to one another, and the friction drive wheel 67 has its outer circumference in driving contact with the upper radial face of the pulley 65 so that, upon rotation of the pulley 65 by the belt 64, the wheel 67 will be driven about its axis by the frictional engagement with the pulley 65. Since shafts 66 and 68 are perpendicular to one another, the plane of the drive wheel 67 will be perpendicular to a radius of pulley 65 at the point of contact between the pulley and the drive wheel and the linear rate at which the circumference of the drive wheel 67 is driven will be equal to the linear rate of the radial face of the pulley 65 at the point of contact thereof with the wheel 67.

The support arm assembly 14' maintains the axis of shaft 68 on a substantially radial line with respect to the record 10 throughout the arcuate movement of the drive bracket 41 beneath the turntable 11, thereby maintaining the plane of the drive wheel 67 substantially perpendicular to a radius of the record disc 10. The spring 46 urging the rearwardly extending platform 49 of bracket 35 downwardly acts to urge the drive wheel 67 into driving engagement with the lower frictional surface 69 of a drive disc 70 mounted on the lower surface of turntable 11 for rotation therewith. The bottom surface of the drive disc 70 has a helical groove 71 formed therein with the helical groove having a pitch corresponding to the pitch of the helical sound track formed in the upper surface of the record disc 10.

A plurality of guide needles 72 are mounted in each of two follower blocks 73, 74 mounted on drive bracket 41, with one of the follower blocks being supported on each side of the drive wheel 67. The needles 72 are positioned to engage the helical groove 71 along a radial line, with the resilient spring 46 retaining the needles in the groove 71.

Thus, the frictional engagement between the drive wheel 67 and drive surface 69 rotates the drive disc 70 and turntable 11 about the vertical shaft 12. This rotation of the drive disc 70, acting through the helical grooves 71 and guide needles 72 continuously cams the drive bracket 41, and drive assembly supported thereby, inwardly along an arcuate path toward the shaft 12. Since the pitch of the helical groove 71 corresponds to the pitch of the helical sound track in the record, the stylus 16 will simultaneously move radial inward across the face of the recording disc with the pick-up needle 16' remaining directly above the point of contact of the wheel 67 with the drive disc 70. Since drive wheel 67 is driven at a constant r.p.m., and further since the contact between the wheel 67 and the disc 70 is directly beneath the needle 16', the linear rate of movement of the needle over the surface of the record disc 10 will remain constant. However, since the radial distance from the center of rotation of shaft 12 and the point of contact between the drive wheel 67 and the drive disc 70 is constantly changing, the angular rate of rotation of the turntable 11 and the record disc 10 supported thereon will be constantly changed.

Preferably, the pin 42 fits within the bore of the tube 44 with sufficient clearance to permit slight relative radial movement between the pick-up head 15 and the drive bracket 41 so that these elements are driven in their arcuate path by the contact of the needles 16 and 72, respectively, with their cooperating helical groove. Therefore, when pickup head 15 is lifted and swung across the surface of record 10, the needles 72 will simultaneously be moved downwardly from engagement with the drive disc 70 and arm assembly 14' will be constrained to follow arm assembly 14, thereby assuring that the needles 16 and drive wheel 41 are always in substantial vertical alignment.

Figures 3, 4, 5, 6, 7, 8, 9:
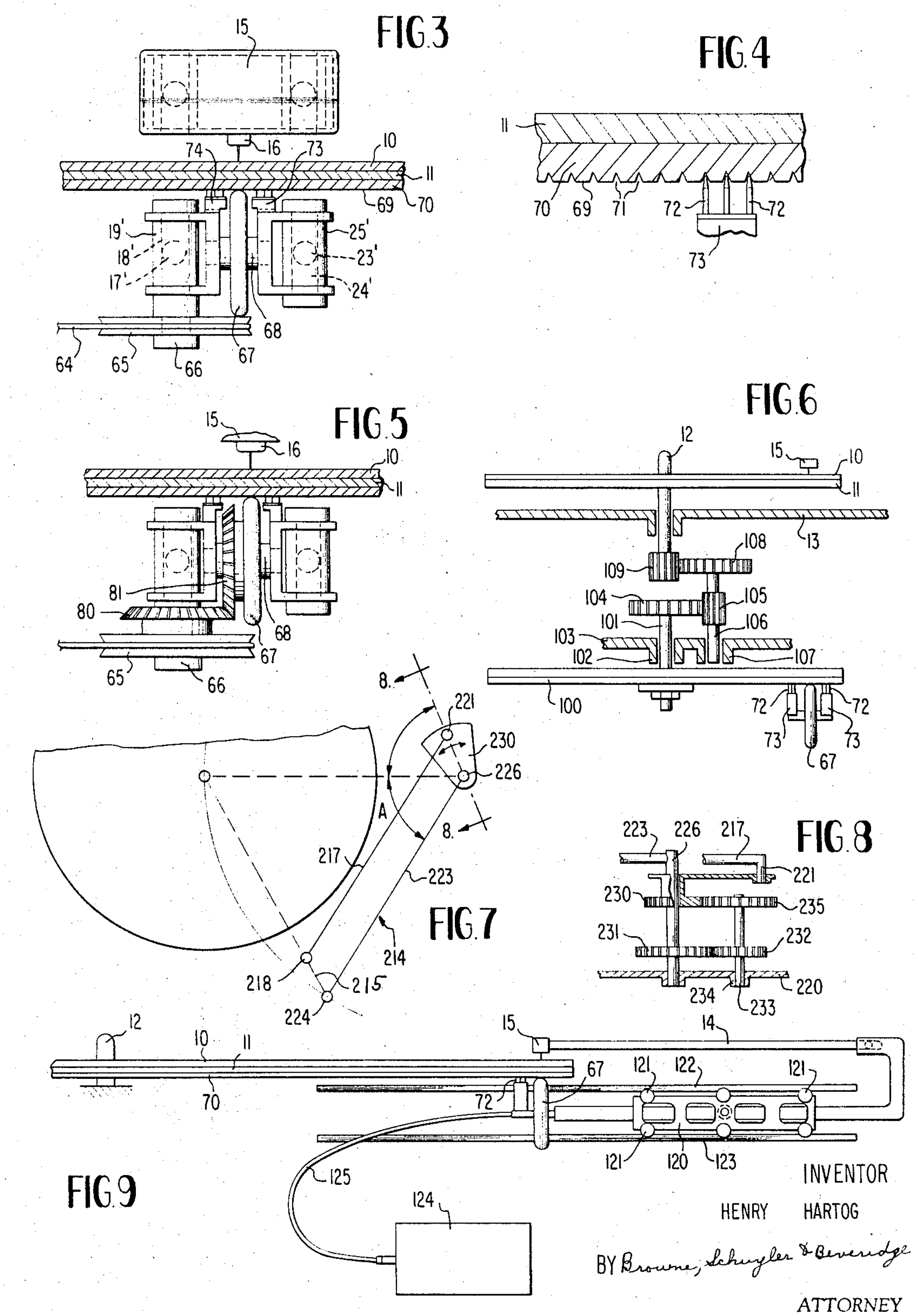
FIG. 3 is an elevation view taken along line 3—3 of FIG. 2.
FIG. 4 is an enlarged view showing a portion of the mechanism shown in FIG. 3.
FIG. 5 is a view similar to FIG. 3, illustrating an alternate drive arrangement for the device.
FIG. 6 is a schematic showing of an alternate embodiment of the invention.
FIG. 7 is a schematic showing of a modification of the mechanism shown in FIGS. 1 and 2.
FIG. 8 is an enlarged view taken on line 8—8 of FIG. 7.
FIG. 9 is a schematic showing of a further embodiment of the invention.

Referring to FIG. 5, an alternate embodiment of the drive arrangement is shown wherein a bevel gear 80 is mounted on shaft 66 for rotation with pulley 65, and a second bevel gear 81 is mounted on shaft 68 for rotation with the friction drive wheel 67, with the bevel gears 80, 81 meshing with one another to provide a positive drive between the pulley 65 and the friction drive 67.

In certain instances, it may be desirable to isolate the drive disc 70 and the follower needles 72 from the turntable to eliminate the possibility of any vibrations being transmitted from the drive mechanism to the pick-up stylus. Such an arrangement is illustrated in FIG. 6 wherein the drive disc 100 is mounted on the end of a shaft 101 for rotation therewith by a bearing 102 in frame member 103. A gear 104 mounted on the shaft 101 meshes with a first gear 105 on an idler shaft 106 supported by a bearing 107 in frame member 103, and a second gear 108 on shaft 103 meshes with a gear 109 rotatably fixed on the lower end of the turntable shaft 12. Thus, rotation of the drive disc 100 by the friction drive wheel 67, acting through the gear train described above, will drive the turntable 11 at a rate corresponding to the rate of rotation of the drive disc 100. It is believed apparent, also, that in this arrangement it is not necessary to have the same pitch between the helical groove of the sound track and the helical groove on the drive disc so long as an appropriate gear ratio is maintained between the drive disc and the turntable.

Referring now to FIG. 9, a still further embodiment of the invention is illustrated schematically in which both the pick-up head 15 and the drive assembly 41 are supported for straight line radial movement by a carriage 120 supported by suitable rollers 121 for movement over an upper and lower track 122, 123 respectively, by the cam action of the needles 72 with the helical groove 71. In such an embodiment, the friction drive wheel 67 may be driven by constant r.p.m. motor 124 through a flexible shaft 125.

As stated above, so long as tracking error is not a problem, the physical size of disc records produced or played on an apparatus according to the present invention is limited only by structural considerations. Further, if the recording is both formed and played on an apparatus of the construction described, the tracking error problem is eliminated since any minor variation of the stylus of a record cutting apparatus from a true tangential position with respect to the helical groove (resulting from the pivotal support arrangement of the tone arm described above) will be exactly duplicated by the stylus of the pickup assembly in a playback apparatus. However, where the record is produced on an apparatus which maintains the cutting stylus exactly tangential to the helical groove, i.e., exactly perpendicular to a radius of the disc recording, tracking error of the playback stylus may be eliminated by the mechanism illustrated in FIGS. 7 and 8. While only the tone arm is illustrated schematically in FIGS. 7 and 8, it is understood that the drive support arm is of similar construction and therefore it is not deemed necessary to describe both arm assemblies here. In this embodiment, the tone arm assembly 214 comprises parallel support and guide arms 217, 223, respectively, with the support arm 217 having one end pivoted at 221 to a movable support 230 and its other end pivoted as at 218 to the pick-up head 215. Similarly, the guide arm 223 has one end pivoted to bracket 230 by pin 226, and its other end pivoted as at 224 to the pick-up head 215. Since arms 217 and 223 are parallel, the distance between pins 218 and 224 is equal to the distance between pins 221 and 226.

Referring to FIG. 8, it is seen that pivotal movement of the tone arm assembly 214 about the fixed pivot 226 will cause rotational movement of the bracket 230 about the fixed pivot 226. This is accomplished by a gear 231 mounted on the pin 226 for rotation therewith for driving a gear 232 on an idler shaft 233 mounted for rotation on bracket 220 by a bearing 234. A second gear 235 is mounted on shaft 233 and meshes with a gear 236 fixed on bracket 230 for rotation therewith about the axis of pin 226. The gear ratio between the pin 226 and the bracket 230 is such that the bracket 230 is made to follow the angular motion of the arm 223 at one half the speed thereof. Under these conditions there is, for all values of the angle A (the angle between the arm 223 and the radial line extending through shaft 12 and pivot 226) perfect radial alignment between the shaft 12, the pin 218, and the pin 224. Thus, while this embodiment may be slightly more complex than the earlier described embodiments of the invention, where tracking error may conceivably effect the quality of the sound reproduction, this more complex embodiment may be desirable.

While I have disclosed preferred embodiments of my invention, I wish it understood that I do not intend to be restricted solely thereto, but that I do intend to include all embodiments thereof which would be apparent to one skilled in the art and which come within the spirit and scope of my invention.

I claim:

1. In a sound reproducing apparatus including a horizontal turntable adapted to support a disc record for rotation about a vertical axis, drive means for rotating said turntable, and a movable tone arm supporting a stylus in position to traverse the upper surface of a record supported on said turntable, the improvement wherein said drive means comprises a rotatably mounted drive disc operatively connected to said turntable for rotation therewith, said drive disc having a radial friction surface thereon, a friction drive wheel mounted for rotation at a constant angular rate about an axis substantially perpendicular to the axis of rotation of said drive disc and with the circumference of said drive wheel in frictional contact with said radial friction surface, and guide means for varying the radial position of said drive wheel on said radial friction surface, said guide means including means for varying the radial position of said drive wheel relative to said drive surface in accordance with the change of position of said stylus as said stylus traverses the upper surface of a record on said turntable, and further including means connected to said guide means and said tone arm for allowing limited radial relative movement with respect to each other while the tone arm and drive wheel are moving radially during playing of a record such that the tone arm and guide means move substantially independently of one another and said means further allowing said drive wheel to be moved radially of said radial friction surface in response to radial movement of said tone arm when the stylus is disengaged from the surface of a record supported on the turntable.

2. The sound reproducing apparatus defined in claim 1 further including means for disengaging said drive means upon disengagement of said stylus from the surface of a record on said turntable.

3. The sound reproducing apparatus defined in claim 1 wherein said drive disc is an integral part of said turntable and said radial friction surface is the lower surface of said turntable.

4. The sound reproducing apparatus defined in claim 1 wherein said means for varying the radial position of said drive wheel includes a helical groove formed in said radial friction surface, and at least one follower needle operatively connected to said guide means and engaging said helical groove to cam said drive wheel radially of said rive disc upon rotation thereof.

5. The sound reproducing apparatus defined in claim 3 wherein said guide means further includes pivoted support arm means supporting said drive wheel for arcuate movement over said radial surface, said support arm including means for maintaining the axis of rotation of said drive wheel substantially perpendicular to the axis of rotation of said drive disc.

6. The sound reproducing apparatus defined in claim 5 wherein said tone arm and said support arm are mounted in vertically aligned superimposed relation, and said support arm maintains said drive wheel in contact with said radial friction surface directly beneath said stylus when said stylus is traversing a record on said turntable.

7. The sound reproducing apparatus defined in claim 5 wherein said support arm comprises a first elongated bar having one end supported for pivotal movement about a first vertical axis and its other end pivotally connected to and supporting a bracket, a second elongated bar having one end pivotally connected to said bracket and its other end supported for pivotal movement about an axis parallel to said first axis on a movable platform supported for rotation about said first axis, and means for rotating said platform in response to pivotal movement of said first elongated bar about said first axis.

8. The sound reproducing apparatus defined in claim 5 wherein said tone arm and said support arm each comprise a first elongated bar having one end supported for pivotal movement about a first vertical axis and its other end pivotally connected to and supporting a bracket, a second elongated bar having one end pivotally connected to said bracket and its other end supported for pivotal movement about an axis parallel to said first axis on a movable platform supported for rotation about said first axis, and means for rotating said platform in response to pivotal movement of said first elongated bar about said first axis.

9. In sound reproducing apparatus defined in claim 1, the further improvement wherein said tone arm comprises a first elongated bar having one end supported for pivotal movement about a first vertical axis and its other end pivotally connected to and supporting a bracket, a second elongated bar having one end pivotally connected to said bracket and its other end supported for pivotal movement about an axis parallel to said first axis on a movable platform supported for rotation about said first axis, and means for rotating said platform in response to pivotal movement of said first elongated bar about said first axis, said means for rotating said platform including speed reduction means operatively connecting said first elongated bar and said movable platform to rotate said platform about said first axis at a rate equal to one half the rate of said first bar.

References Cited

UNITED STATES PATENTS

| | | | |
|---|---|---|---|
| 1,399,917 | 12/1921 | Atkinson | 274—1.6 X |
| 1,438,642 | 12/1922 | Graham | 274—23.1 |
| 1,864,519 | 6/1932 | Boularan | 274—1.6 |
| 2,049,821 | 8/1936 | Nystrom | 274—1.6 |
| 2,076,298 | 4/1937 | Harris | 274—1.6 |
| 2,522,997 | 9/1950 | Coppleman | 274—23.1 |
| 2,692,141 | 10/1954 | Rudenauer | 274—1.6 X |
| 2,977,126 | 3/1961 | Chalfin | 274—23.1 |
| 2,983,517 | 5/1967 | Klein | 274—23.1 |

FOREIGN PATENTS

| | | |
|---|---|---|
| 676,429 | 11/1929 | France. |

HARRY N. HAROIAN, *Primary Examiner.*

U.S. Cl. X.R.

274—23